United States Patent [19]

O'Neill et al.

[11] Patent Number: 5,378,367
[45] Date of Patent: Jan. 3, 1995

[54] METHOD FOR REMOVING COLOR-IMPARTING CONTAMINANTS FROM PULP AND PAPER WASTE STREAMS USING A COMBINATION OF ADSORBENTS

[75] Inventors: Gary A. O'Neill, Tyngsborough, Mass.; George M. Goyak, Murrysville, Pa.

[73] Assignee: Aluminum Company of America, Pittsburgh, Pa.

[21] Appl. No.: 981,601

[22] Filed: Nov. 25, 1992

[51] Int. Cl.$^6$ .............................................. C02F 1/28
[52] U.S. Cl. ................................. 210/669; 210/691; 210/694; 210/908; 210/909; 210/917; 210/928
[58] Field of Search ................ 162/189, 190; 210/917, 210/908, 909, 663, 669, 679, 691, 694, 502.1, 263, 749, 199, 928

[56] References Cited

U.S. PATENT DOCUMENTS

| | | | |
|---|---|---|---|
| 2,744,938 | 5/1956 | Urban, Jr. | 210/917 |
| 3,420,709 | 1/1969 | Barrett, Jr. et al. | 210/917 |
| 3,627,679 | 12/1971 | Fuller | 210/928 |
| 3,652,407 | 3/1972 | Paleos | 210/917 |
| 3,833,463 | 9/1974 | Croom | 210/917 |
| 3,879,525 | 4/1975 | Miyata et al. | 423/277 |
| 4,264,373 | 4/1981 | Shinbori et al. | 127/55 |
| 4,458,030 | 7/1984 | Manabe et al. | 502/183 |
| 4,740,488 | 4/1988 | Folger et al. | 502/84 |
| 4,752,397 | 6/1988 | Sood | 210/662 |
| 4,895,662 | 1/1990 | Stevens | 210/928 |
| 4,915,930 | 4/1990 | Goheen et al. | 423/629 |
| 4,916,095 | 4/1990 | Folger et al. | 502/62 |
| 4,927,465 | 5/1990 | Hyder et al. | 106/486 |
| 4,929,762 | 5/1990 | Matsunaga et al. | 568/361 |
| 4,933,494 | 6/1990 | Tubota et al. | 568/33 |
| 4,935,146 | 6/1990 | O'Neill et al. | 210/684 |
| 5,068,095 | 11/1991 | Nigro et al. | 423/122 |
| 5,075,017 | 12/1991 | Hossain et al. | 210/928 |
| 5,149,456 | 9/1992 | Concannon et al. | 252/174.25 |
| 5,198,004 | 3/1993 | Vollhardt | 55/227 |
| 5,213,660 | 5/1993 | Hossain et al. | 162/63 |

FOREIGN PATENT DOCUMENTS

60-094687  5/1985  Japan ........................... D21C 9/08

*Primary Examiner*—Cynthia L. Nessler
*Attorney, Agent, or Firm*—Gary P. Topolosky; Glenn E. Klepac

[57] ABSTRACT

A method for treating a pulp and paper manufacturing stream to remove colorants therefrom comprises: contacting the stream with a first adsorbent comprising the calcined product of a compound having the formula: $A_wB_x(OH)_yC_z \cdot nH_2O$, wherein A represents a divalent metal cation; B a trivalent metal cation; C a mono- to tetravalent anion; and w, x, y, z and n satisfying the following: $0 < z \leq x \leq 4 \leq w \leq \frac{1}{2}y$ and $12 \geq n \geq \frac{1}{2}(w-x)$; then contacting the stream with a second adsorbent consisting essentially of activated carbon. On a preferred basis, the first contacting adsorbent is a hydrotalcite derivative made by reacting activated magnesia with an aqueous solution of aluminate, carbonate, and hydroxyl anions before calcining at one or more temperatures between about 400°–650° C. There is further disclosed means for removing dioxins and adsorbable organic halogens, especially chlorinated phenols, from waste water solutions using the aforementioned combination of adsorbents.

4 Claims, 1 Drawing Sheet

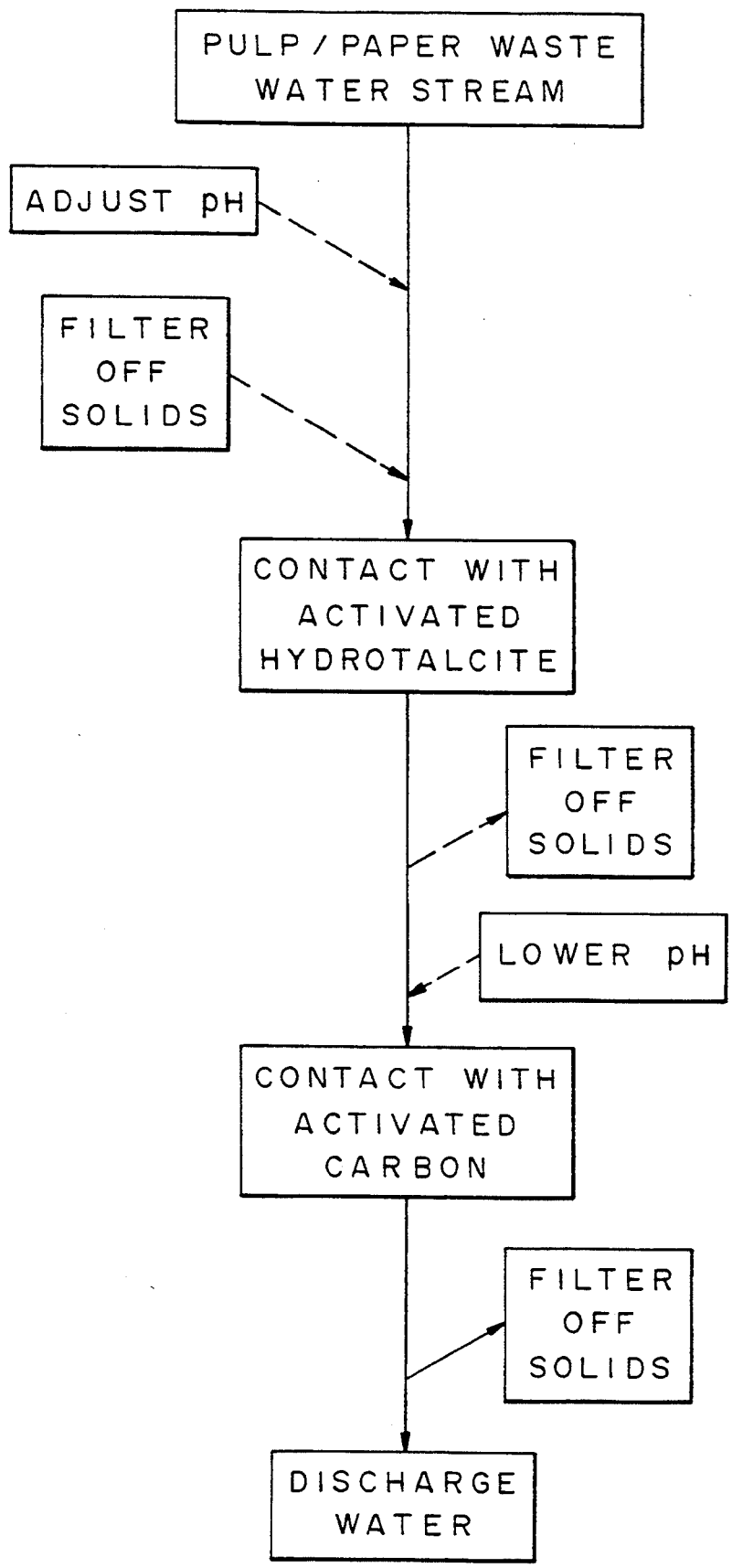

METHOD FOR REMOVING COLOR-IMPARTING CONTAMINANTS FROM PULP AND PAPER WASTE STREAMS USING A COMBINATION OF ADSORBENTS

BACKGROUND OF THE INVENTION

1. Field of the Invention

This invention relates to the field of treating pulp/paper streams for removing colorants therefrom. The invention further relates to means for removing dioxins and aromatic organic halogens, especially chlorinated phenols, from aqueous solutions.

2. Technology Review

Several principal means for making pulp and paper from wood products are set forth in chapter 33 of *Shreve's Chemical Process Industries*, 5th ed., the disclosure of which is fully incorporated by reference herein. One well-known means is known as the kraft process. This process involves several stages, some of which are acidic and others which are caustic in nature. Many of the solutions in contact with wood during this process break down lignins into solubilized products which add color to the water stream and intermediate paper products. Often, these intermediate products are subjected to intense bleaching phases to produce an end product with improved whiteness. Bleaching may also be done in the sulfite process, or in mechanical pulping to a lesser extent.

The presence of known colorants, dioxins and adsorbable organic halogens (or AOX's), especially chlorinated phenols, makes pulp/paper waste waters, particularly bleach effluents, unsuitable for discharge. Current technologies for treating such waters include organic oxidation using ultraviolet light, a rather costly technique, and various biotreatments which are not always effective. Still other known means include dumping mass quantities of lime or alum into effluent streams, the latter of which causes complications by generating significant amounts of spent solid contaminants.

SUMMARY OF THE INVENTION

It is a principal objective of this invention to provide improved means for treating pulp/paper rinse streams and other effluents to reduce the amount of colorants therein. The invention does not concern itself with the removal of pitch or lignin per se from pulp/paper streams, but rather, the color causing derivatives from lignin dissolution, among other contaminants. It is another objective to provide processes for removing dioxins and AOX's, especially chlorinated phenols, from an aqueous solution. Still another objective is to provide a pulp/paper stream treatment process which lowers typical color unit (C.U.) contamination levels for about 15,000 C.U.'s (A/B), based on the Pt-Co standard set forth in A.S.T.M. D1209-84, the disclosure of which is fully incorporated by reference herein, to about 50 C.U.'s (A/B) or less, and well below required levels for normal discharge. It is another principal objective to provide water treatment processes for the pulp/paper industry which do not generate significant amounts of spent solid materials or residual waste sludge for disposal.

In accordance with the foregoing objectives and advantages, there is provided means for treating a pulp/paper waste stream to remove substantially all colorants, especially the dioxin and AOX levels therein. The method comprises: (a) contacting such streams with a first adsorbent comprising a fully or partially calcined product of a compound having the formula: $A_wB_x(OH)_yC_z \cdot nH_2O$ wherein A represents a divalent metal cation; B a trivalent metal cation; C a mono- to tetravalent anion; and w, x, y, z and n satisfy the following:

$0 < z \leq x \leq 4 \leq w \leq \frac{1}{2}y$ and $12 \geq n \geq \frac{1}{2}(w-x)$; then (b) contacting said stream with a second adsorbent consisting essentially of activated carbon. On a preferred basis, said first adsorbent is added directly to the stream in a dry, powdered form, or as part of a slurry. Alternately, bleaching effluent streams may be passed through a containment, or filter bed, including the aforementioned compound or its derivatives. A preferred first adsorbent consists essentially of a compound made by reacting activated magnesia with an aqueous solution of aluminate, carbonate and hydroxyl ions. This compound is then thermally activated at one or more temperatures between about 400°–650° C. (752–1202° F.). A quantity of activated carbon is then added to the stream, preferably in powdered form, after which decolorized water is separated from these contaminants, typically through filtration. There is further disclosed means for removing dioxins and AOX from an aqueous solution using the aforementioned combination of adsorbents.

BRIEF DESCRIPTION OF THE DRAWING

Further features, other objectives and advantages of this invention shall be made clearer from the following detailed description of preferred embodiments made with reference to the accompanying FIGURE which is a flow chart depicting one preferred method for practicing the invention with optional steps connected to said chart using dotted arrow lines.

DETAILED DESCRIPTION OF PREFERRED EMBODIMENTS

In the following detailed description, repeated reference is made to the treatment of pulp/paper streams, especially those resulting through the normal practice of oxidative bleaching, using a first adsorbent consisting of the calcined or thermally activated product of a metal hydroxide belonging to the structural component family having the formula: $A_wB_x(OH)_yC_2 \cdot nH_2O$, wherein A represents a divalent metal cation, B a trivalent metal cation, C a mono- to tetravalent anion, and w, x, y, z and n satisfy the following conditions: $0 < z \leq x \leq 4 \leq w \leq \frac{1}{2}y$ and $12 \geq n \geq \frac{1}{2}(w-x)$ and a second adsorbent consisting essentially of activated carbon. Preferred members of the first adsorbent family include compounds having the formula: $A_6B_2(OH)_{16}C_z \cdot 4H_2O$, wherein A is selected from: $Mg^{2+}$, $Ni^{2+}$, $Fe^{2+}$ and $Zn^{2+}$; B from: $Al^{3+}$, $Fe^{3+}$ and $Cr^{3+}$; and C from an anion list which includes: $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $Fe(CN)_6^{4-}$ with z being greater than or equal to $\frac{1}{2}$ and less than or equal to 2 depending on the charge of the anion being substituted therein. Some references collectively refer to all such compounds as "hydrotalcites". For the present invention, this family has been divided into various subgroups depending on the divalent and trivalent cations within the alternating brucite-like layers. For example, pyroaurites have the basic formula: $Mg_6Fe_2OH_{16}CO_3 \cdot 4H_2O$. (Such compounds are also known as "sjogrenites".) Takovites, on the other hand, consist of compounds resembling: $Ni_6Al_2OH_{16}CO_3 \cdot 4H_2O$.

As defined herein, "hydrotalcite" includes any natural or synthetic compound satisfying the formula: $Mg_6Al_2(OH)_{16}CO_3.4H_2O$. This compound may be rewritten as: $6MgO.Al_2O_3.CO_2.12H_2O$. In its ionic form, hydrotalcite appears as: $[Mg_6Al_2(OH)_{16}]^{2+}.[CO_3]^{2-}.4H_2O$. The main structural unit for this compound is brucite, or magnesium hydroxide $(Mg(OH)_2)$ having the form of octagonal sheets with a magnesium ion situated between multiple (OH) ions that share adjacent edges. By substituting trivalent aluminum ions for some of the divalent Mg ions in this structure, sublayers of magnesium and aluminum are created which maintain the basic sheet-like structure for brucite. To compensate for the charge imbalance from these aluminum ion substitutions, anions (indicated by letter "C" in the foregoing formulae) and water molecules are intercalated to form interlayers of $(C_z.nH_2O)$ between the brucite-like structural layers, with $\frac{1}{2} \leq z \leq 2$ depending on the anionic charge(s) intercalated therein. The anion having the greatest affinity to combine with water in this structure and to form hydrotalcite is carbonate $(CO_3^{2-})$.

The spacial distribution of carbonate ions within hydrotalcite depends, in part, on how the $Al^{3+}$ ions substitute for the $Mg^{2+}$ ions therein. Brucite layer spacing is also a function of the amount or degree of aluminum substitution into hydrotalcite's basic structure. As aluminum substitution increases, interlayer spacing decreases due to an increase in the electrostatic attraction between positive hydroxide layers and hydrotalcite's negative interlayers. Interlayer thicknesses may also vary depending on the size and orientation of the anions substituted for some or all of the carbonate ions inserted into hydrotalcite.

Hydrotalcite exists in both a natural and synthetic form. Naturally occurring deposits have been found in Snarum, Norway and in the Ural Mountains. Typical occurrences are in the form of serpentines, talc schists, or as a pseudomorph of a spinel. Like most ores, natural hydrotalcite is virtually impossible to find in a pure state. Natural deposits typically contain one or more other minerals including, but not limited to, penninite and muscovite.

Several methods for making synthetic hydrotalcite are also known. Such synthetic products may be produced as a fine powder, −20 mesh granules or as ⅛-inch diameter extrudates, among other forms. In U.S. Pat. No. 3,539,306, an aluminum hydroxide, aluminum-amino acid salt, aluminum alcoholate, water soluble aluminate, aluminum nitrate and/or aluminum sulfate are mixed with a magnesium component selected from magnesium oxide, magnesium hydroxide or water-soluble magnesium salt; and a carbonate ion-containing compound in an aqueous medium maintained at pH of 8 or more. The resulting product may be used as a stomach antacid. Another method for synthesizing hydrotalcite is disclosed in Misra U.S. Pat. No. 4,904,457, the disclosure of which is fully incorporated by reference herein. That method comprises heating magnesium carbonate and/or magnesium hydroxide to form activated magnesia, then combining said activated magnesia with an aqueous solution of aluminate, carbonate and a hydroxyl.

Other known methods for synthesizing hydrotalcite include: adding dry ice or ammonium carbonate to: (a) a mixture of magnesium oxide and alpha-alumina; or to (b) a thermally decomposed product from a magnesium nitrate-aluminum nitrate mixture, after which intermediate product is subjected to temperatures below about 325° F. and pressures of 2,000 to 20,000 psi. Yet another process for producing synthetic hydrotalcite is disclosed in "Properties of a Synthetic Magnesium-Aluminum Carbonate Hydroxide and its Relationship to Magnesium-Aluminum Double Hydroxide Manasseite, and Hydrotalcite", The American Minerologist, Vol. 52, pp. 1036–1047 (1967). Therein, Ross et al describe producing hydrotalcite-like material by titrating a solution of $MgCl_2$ and $AlCl_3$ with NaOH in a carbon dioxide-free system. This suspension is dialyzed for 30 days at 60° C. to form a hydrated Mg—Al carbonate hydroxide having the properties of both manasseite and hydrotalcite.

In preferred embodiments of this invention, pulp and paper manufacturing streams are treated in several stages, first through contact with a first adsorbent comprising thermally activated or calcined hydrotalcite for adsorption of at least some of the colorants onto said first adsorbent. This is followed by a second phase treatment using activated carbon, though it is to be understood that said first and second adsorbents may be added to the stream near simultaneously on a less preferred basis. By use of the term "comprising", it is meant that the first contacting adsorbent should contain greater than about 85 or 90%, and more preferably greater than about 95 or 98%, of the calcined (or activated) form of hydrotalcite. Still lower percentages of calcined hydrotalcite may be used for initial stream contacting, even as low as 50% in total content. But at such lower levels, the methods of this invention may require larger (or repeated) dosages of first adsorbent for achieving similar preliminary colorant removal efficiencies.

By use of the term "substantially", it is meant that virtually all dioxins (down to 5 parts per guadrillion or less) and virtually all AOX present (at least about 95 to 97% thereof) are removed from solution according to this invention. As physical processes are not often perfect, however, every last vestige of colorant/impurity may not be removed through contact with both calcined hydrotalcite and calcined carbon, especially where intentional underdosing may have occurred.

In its fully activated state, the first adsorbent, calcined hydrotalcite, is believed to have the formula: $Mg_6Al_2O_8(OH)_2$. When only partially activated or calcined, hydrotalcite will still contain more hydroxy ions and possibly water molecules between the catalyst. An alternative embodiment of this invention employs for its first adsorbent granular calcined hydrotalcite, which may be made by combining calcined hydrotalcite powder with up to about 35% of one or more binder materials.

The heat treatment of natural or synthetic hydrotalcite to form a calcined variant may be carried out in any conventional (or newly-developed) medium preferably maintained at temperatures between about 400°–650° C. (952°–1202° F.). Preferred activation temperatures between about 500°–650° C. (932°–1202° F.) tend to maximize this compound's surface area and pore volume, while heating to above about 800° C. (1472° F.) will generally impair the overall adsorptive capacity of this compound.

Following thermal activation, an adsorbent with a porous, skeletal structure is produced from which most, if not all, water and carbonate ions have been expelled. This product has an average pore diameter of about 55 angstroms; a skeletal (or solid component) density of about 2.9 g/cm³; and a total pore volume of about 0.3 cm$^3$/g. After calcination, hydrotalcite's specific surface area increases from about 20 m$^2$/g to between about 50–200 m$^2$/g, as determined by BET nitrogen adsorption.

In one embodiment of this invention, the overall colorant level of a bleach effluent solution obtained during the manufacture of pulp intermediates and paper end products via kraft pulping and/or Cl$_2$ bleaching processes is lowered through contact with a first adsorbent comprising a calcined form of a compound having the formula A$_6$B$_2$(OH)$_{16}$C$_z$.4H$_2$O, wherein A is selected from Mg$^{2+}$, Ni$^{2+}$, Fe$^{2+}$ and Zn$^{2+}$; B from: Al$^{3+}$, Fe$^{3+}$ and Cr$^{3+}$; C from: OH$^-$, Cl$^-$, Br$^-$, NO$_3^-$, CH$_3$COO$^-$, CO$_3^{2-}$, SO$_4^{2-}$, PO$^3$, Fe(CN)$_6^{3-}$ and Fe(CN)$_6^{4-}$ with $\frac{1}{2} \leq z \leq 2$. Contacted adsorbent is then separated from this solution for further treatment using a second, activated carbon adsorbent. Only contacted adsorbent which is saturated (or fully loaded) with colorants should be removed from any stage of this treatment process when undersirable levels of contaminants still remain.

In preferred embodiments, initial colorant removal is practiced by adding powdered (or granulated) forms of calcined hydrotalcite directly to the solutions being treated. The amount of substance to add may be predetermined by testing representative samples so as to avoid underdosing or wasteful overdosing. The saturated or spent adsorbent may then be separated from such streams by any known or subsequently-developed technique, or combination of techniques, including but not limited to: filtration, gravity settling and centrifugation.

Fully or partially calcined hydrotalcite powders may also be combined with up to about 35% of one or more binders before being extruded, formed or otherwise shaped into large particle sizes. On a preferred basis, calcined hydrotalcite combined with up to about 10% binder produces granules for better handling and/or disposal. Suitable binder materials include, but are not limited to, ethyl cellulose, Ludox ® (a colloidal silica sold by E. I. DuPont de Nemours of Wilmington, Del.), and Cab-o-sil ® (a colloidal silica sold by Cabot Corporation of Boston, Mass.). Such granules may then be loaded in a column, fluidized bed or other containment through which contaminated aqueous streams containing dioxins, AOX and/or other colorants may be passed.

It may be preferable to adjust pH levels of the stream at or before each contacting step of this method. The first pH adjustment, to levels at or above 5, and more preferably above about 10, enhances colorant removal with activated hydrotalcite. This may be accomplished through the addition of excess activated hydrotalcite or other caustic compounds to the stream. Following separation (filtration) of the solids generated by first pH adjustment, a second pH adjustment back to levels at or below about 6 may enhance the adsorptive capacity of the second adsorbent, activated carbon, being added to this stream.

Another embodiment of this invention concerns the removal of dioxins and AOX, especially chlorinated phenols, from solution. Representative chlorinated phenols removed from solution by this method include: chloroguaiacol, chlorovanillin, chlorocatechol, 3,5-dichloro-4-hydroxybenzaldehyde, dichloroprotocatechualdehyde, 3,4,5-trichloro-2,6-dimethoxyphenol, and dichlorosyringol. Still other AOX's may be removed from solution hereby.

The method of this invention is generally more receptive to adsorbing from neutral or alkaline solutions anionic colorants which are divalent, trivalent or higher. Calcined hydrotalcite also removes monovalent contaminants from such liquors, and even certain cationic contaminants. Without being limited as to any particular theory of operation, it is believed that preferred embodiments of the first phase to this invention proceed as follows. Upon calcination (or activation), both carbonate and water are expelled from hydrotalcite's basic structure to produce a substance having the formula:

Mg$_6$Al$_2$(OH)$_{16}$CO$_3$.4H$_2$O 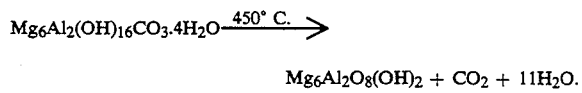

$$Mg_6Al_2O_8(OH)_2 + CO_2 + 11H_2O.$$

Contact with a pulp/paper stream may then causes such colorants to occupy the vacated anion positions in calcined hydrotalcite during rehydration. The foregoing mechanism explains why the first step of this method proceeds more efficiently in environments which are substantially free of carbon dioxide and/or carbonate. The latter compounds are generally preferred during standard hydrotalcite rehydration.

The following Table details the amount of total colorant and AOX removed using individual dosages of each adsorbent versus combinations thereof. For each sample, a constant mixing temperature of about 25° C. (77° F.) was used. The Color Unit (C.U.) scale for such samples is based on the Pt-Co Color Standard for Water and Clear Liquids (A.S.T.M. D-1209-84), which system employs 12 Molar hydrochloric acid to adjust sample pH to about 7.6. The absorbance of each treated sample is then measured at 465 nm for comparison with a color standard also measured at 465 nm. Overall sample color is then reported as a CU value based on the formula 500 (A/B) with "A" being sample absorbance divided by "B" or standard absorbance.

TABLE

| Final pH | Amount of Derivative Added (g/l) | Absorbance at 465 nm | Color Units (500 A/B) |
| --- | --- | --- | --- |
| 7.6 | 0 | 3.47 | 13,770 |
| 12.28 | 20.0 g/l activ. htc only | 0.026 | 103 |
| 8.22 | (1) 20.0 g/l activ. htc (2) 1.0 g/l activ. carbon | 0.001 | 3.97 |
| 8.52 | (1) 20.0 g/l activ. htc (2) 5.0 g/l activ. carbon | 0.002 | 7.94 |
| 9.4 | 5.0 g/l activ. carbon only | 2.707 | 10,744 |

Having described the presently preferred embodiments, it is to be understood that the invention may be otherwise embodied by the scope of the claims appended hereto.

What is claimed is:

1. A method for removing color-imparting dioxins from a waste water stream, said method comprising:
   (a) adjusting the pH of the stream to at least about 5;
   (b) contacting said stream with a first adsorbent including a thermally activated form of a compound selected from: hydrotalcite, pyroaurite, takovite and mixtures thereof;
   (c) separating said contacted first adsorbent from the stream; and
   (d) contacting said stream with a second adsorbent including activated carbon.

2. The method of claim 1 wherein step (a) includes adjusting the pH of the stream to at least about 10.

3. The method of claim 1 which further includes adjusting the pH of the stream to less than about 7 prior to step (d).

4. The method of claim 1 wherein said stream is contacted with at least about 5 g/l of activated hydrotalcite in step (b) and with at least about 1 g/l of activated carbon in step (d).

* * * * *